United States Patent [19]
Resch

[11] Patent Number: 4,728,155
[45] Date of Patent: Mar. 1, 1988

[54] PRESSURE MODULATOR ARRANGEMENT FOR A BOOSTING OF BRAKE FORCE AND FOR ANTILOCK CONTROL

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 847,223

[22] Filed: Apr. 2, 1986

[30] Foreign Application Priority Data

Apr. 2, 1985 [DE] Fed. Rep. of Germany ....... 3511972

[51] Int. Cl.$^4$ ........................... B60T 8/44; B60T 17/18
[52] U.S. Cl. ...................................... 303/114; 303/10; 303/116; 303/119; 303/115
[58] Field of Search ................ 303/115, 114, 117, 119, 303/116, 113, 10–12, 61–63, 68–69, 92, 110, 111; 188/345, 181, 355–359; 60/545, 547.1, 58, 579, 562

[56] References Cited

U.S. PATENT DOCUMENTS

| | | | |
|---|---|---|---|
| 3,503,655 | 3/1970 | Heimler | 303/114 |
| 3,640,067 | 2/1972 | Ingram | 188/358 X |
| 3,768,874 | 10/1973 | Riordan | 303/111 |
| 4,438,629 | 3/1984 | Sato et al. | 60/579 |
| 4,492,413 | 1/1985 | Belart et al. | 303/114 X |
| 4,629,258 | 12/1986 | Resch et al. | 303/114 X |
| 4,634,190 | 1/1987 | Wupper | 303/114 |

FOREIGN PATENT DOCUMENTS

| | | |
|---|---|---|
| 2428669 | 9/1975 | Fed. Rep. of Germany . |
| 2644659 | 6/1978 | Fed. Rep. of Germany . |
| 3035576 | 6/1982 | Fed. Rep. of Germany . |

OTHER PUBLICATIONS

"Anti-Blockier-System", Feb. 1983, by Honda Deutschland GmbH, pp. 1–5.

Primary Examiner—Douglas C. Butler
Attorney, Agent, or Firm—Barnes & Thornburg

[57] ABSTRACT

A modulator for a vehicle with a power-assisted hydraulic multiple-circuit brake system, providing an output pressure to a static brake circuit that is proportional to the sum of the forces affecting a pressure modulator piston. These forces include a pedal pressure from the brake-pressure control device to a first driving pressure space of the modulator and booster pressure from the pressure of a proportional control valve to a second driving pressure space of the modulator, which shifts the modulator piston to decrease the output pressure space. Forces produced by auxiliary pressure in a counterpressure space shifts the modulator piston to enlarge the output pressure space. A control valve arrangement disconnects the second driving pressure space from the booster pressure and instead relieves pressure of the second driving pressure space in pressure-reduction phases of the antilock control. The pressure reduction control takes place by the control valve coupling of the output pressure of the auxiliary pressure source into a counterpressure space, thereby shifting the modulator piston in the sense of a volume expansion of its output pressure space and as a result, reducing the pressure in the wheel brake.

15 Claims, 4 Drawing Figures

PRESSURE MODULATOR ARRANGEMENT FOR A BOOSTING OF BRAKE FORCE AND FOR ANTILOCK CONTROL

BACKGROUND AND SUMMARY OF THE INVENTION

This invention relates to a pressure modulator arrangement for a boosting of brake force and for antilock control for a vehicle with a power-assisted hydraulic multiple-circuit brake system having closed statically operated brake circuits.

In the case of a known pressure modulator arrangement of this type, one pressure modulator is provided for each of the total of four wheel brakes of the vehicle. The output pressure of one or the other output pressure space of a tandem master cylinder, that is provided as a brake-pressure control device and can be pedal-operated via a hydraulic or a pneumatic brake booster of the conventional type, can be coupled into the connected wheel brake via the pressure modulator. Each of the pressure modulators has a modulator piston that can be slid in a pressure-sealed manner in a housing. The modulator pistons each have two flanges that are connected with one another by means of a piston rod that is guided through a central bore of a partition of the modulator housing so that it can be slid in a pressure-sealed way. The output pressure space of the respective modulator to which the assigned wheel brake is connected is delimited by one flange and this partition.

The input pressure space of the modulator that is connected with one of the control output pressure spaces of the tandem master cylinder is delimited by the other piston and the partition. By admission of pressure to the input pressure space, the modulator piston is shifted in the sense of a reduction of the output pressure space, resulting in the building-up of brake pressure in the connected wheel brake. Two each of these modulators are housed in a joint housing part in such a way that the flanges of their modulator pistons, that in each case delimit the input pressure space on one side, jointly delimit a counterpressure space in the axial direction. By the admission of pressure to counterpressure space during a control phase of the antilock system, the modulator pistons shift in the sense of an enlargement of the volumes of the output pressure reduction in the connected wheel brake. Into the two counter pressure spaces of this pressure modulating device, the high output pressure of a pressure accumulator can be coupled simultaneously or alternately, under the control of electro magnetic valves. the pressure accumulator is maintained constantly in a charged state by means of an accumulator charge pump. The control-effective triggering of the pressure-reduction control valves takes place by means of output signals of an electronic control unit of the antilock system.

A main disadvantage in the case of the known pressure modulator arrangement is that the modulator pistons, in a pressure-reduction control phase, must be shifted against a high pressure in the respective modulator input pressure space generated with the participation of the brake force booster. Thus accumulator charge pump must be designed for a very high nominal capacity, the typical value of which is 200 w. However, a hydraulic pump that is designed for such a high nominal capacity and output pressures of around 200 bar requires not only a relatively large overall space but is also very expensive and therefore significantly contributes to the costs of an antilock system comprising the pressure modulator arrangement. Because of the required high nominal capacity of the accumulator charge pump, the electrical wiring of the vehicle must also be designed for a higher output power.

It is therefore the objective of the invention to provide a pressure modulator arrangement of the initially mentioned type that, while it also has a simple construction and good operational reliability, on the whole can operate with a charge pump that is designed for a clearly lower nominal capacity, for a pressure accumulator that is utilized as an auxiliary pressure source.

This and other objectives are achieved by the pressure modulators having a first driving pressure space into which the output pressure of the brake-pressure control device is coupled and a second driving pressure space into which the output pressure of a proportional control valve, which is proportional to the pedal force and causes the brake-force boosting, is coupled. A counterpressure space is also provided. In addition, a control valve arrangement is provided which, upon actuating by the antilock control, the second driving pressure space is blocked with respect to the auxiliary pressure source or is relieved of pressure. The admission of pressure to the counter pressure space shifts the modulator piston only against the force resulting from the admission of pressure to the first control pressure space. Thus, against a significantly smaller actuating force than in the case of a normal braking. The accumulator charge pump can thus be designed for a significantly lower nominal capacity, compared with the known pressure modulator arrangement. In practice it is about half the nominal capacity. This results in a considerable lowering of the manufacturing costs. In addition, in the case of the development of the pressure modulators provided according to the invention, the pressure modulator is also utilized as an auxiliary force source for the brake-force boosting which results in a further constructional simplification.

Appropriate selection of the areas of the elements of the pressure modulators has the advantage that, when the auxiliary pressure source is inoperative, i.e., when there is no brake-force boosting, braking can still take place with a good braking deceleration - with a prolonged pedal travel.

By using two the control valves, the appropriate brake pressure control can be realized alternatively or in combination.

A proportional control valve can be integrated in a simple way into a hydraulic unit comprising several pressure modulators. In which case, the hydraulic unit may be arranged away from the brake pressure control device and can be triggered hydraulically. Also, by providing two input pressure spaces in the proportional control valve increased protection is achieved with respect to a partial breakdown of the control circuits of the brake-pressure control device.

By means of a single additional control valve a propulsion control function can also be achieved in a simple way by the present modulator.

Other details and characteristics of the invention are found in the following description of special embodiments by means of the drawing.

DETAILED DESCRIPTION OF THE DRAWINGS

Figure 1:
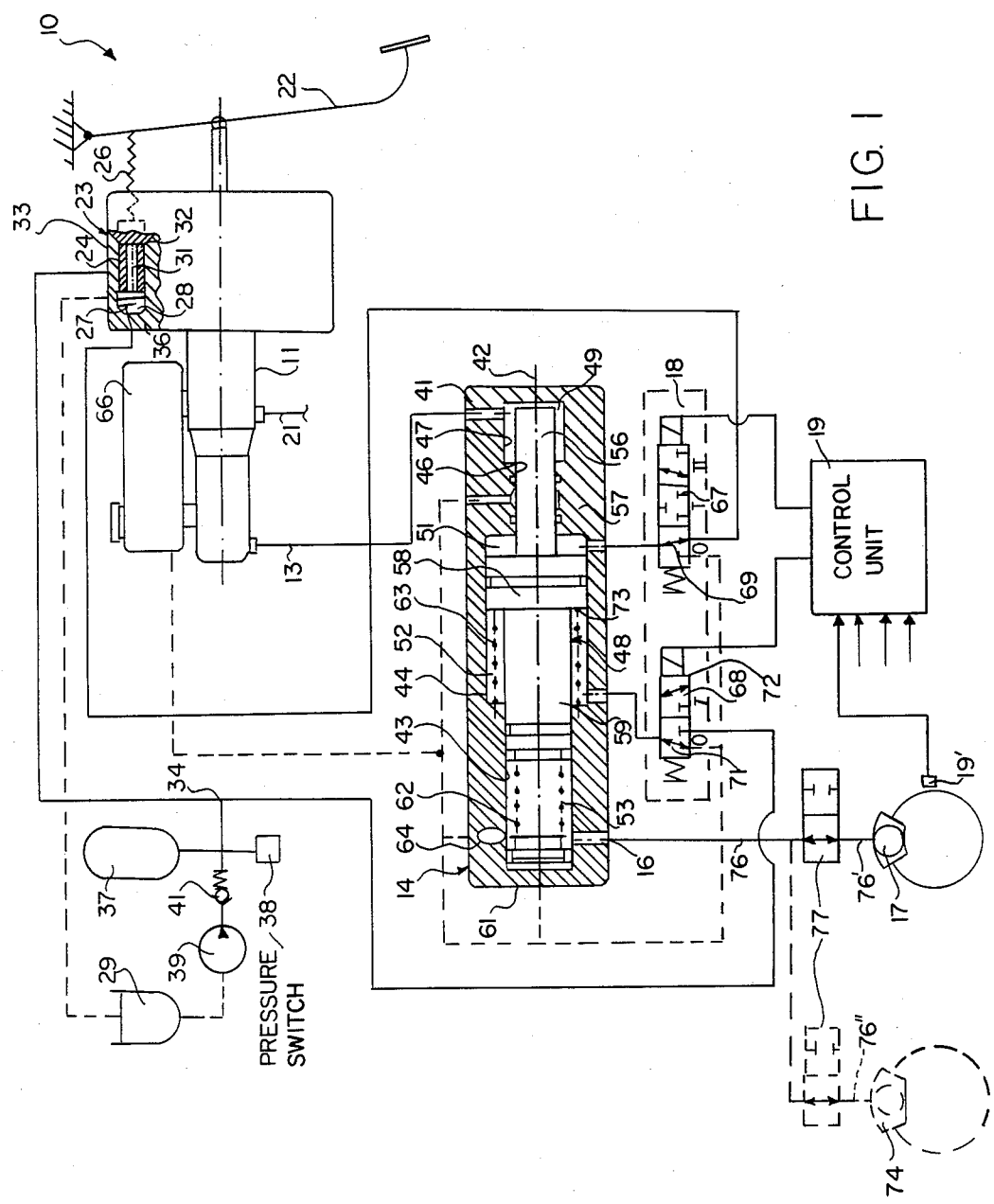
FIG. 1 is a first embodiment of a pressure modulator arrangement according to the invention with a control valve arrangement having separately triggerable boosting and brakepressure reduction control valves.

In FIG. 1, the details are pointed out explicitly of a brake system 10 of a motor vehicle operating with hydraulic auxiliary force or power assistance and equipped with an antilock control system. The brake system 10 includes a brake pressure control device 11 that an be operated by a pedal; a hydraulic auxiliary pressure source 12; a pressure modulator 14 connected to a first pressure output 13 of the brake-pressure control device 11, and utilized for brake force boosting as well as for antilock control; a wheel brake 17 connected to the pressure output 16 of the pressure modulator 14; a control electro-magnetic valve arrangement 18; and the electronic control unit 19 of the antilock system. Other wheel brakes or brake circuits of the vehicle that can be driven with brake-force boosting and can be independently subjected to antilock control but are not shown. A pressure modulator 14 and control valve arrangement 18 connected to pressure output 13 or 21 of the brake-pressure control device 11, may be provided for each additional brake circuit for adequate control which, for reasons of simplicity, are not shown separately.

The brake-pressure control device 11 is a tandem master cylinder of conventional construction that can be operated by means of a brake pedal 22. A floating piston separates the primary output pressure space from the secondary output pressure space of the tandem master cylinder. The primary output pressure is located at output 21 and the secondary output pressure of the tandem master cylinder is located at its output 13.

A proportional control valve 23 of a construction that is known per se is integrated into the brake-pressure control device 11. The proportional control valve 23 supplies an output pressure that is derived from the output pressure of the auxiliary pressure source 12 having a typical value of between 160 and 200 bar and is proportional to the pedal force.

A possible development of this proportional control valve 23 that in regard to its construction can be realized in different ways, is briefly explained in the following:

The proportional control valve 23 contains a piston 24 that can be axially shifted in a housing bore and connected to brake pedal via a pressure spring 26. The piston 24 itself can be shifted against the restoring force of a counterspring 27. Inside the valve housing, the piston 24 delimits an output pressure space 28 that, in the normal position of the valve piston 24, is connected with the tank 29 of the auxiliary pressure source 12. Via a central duct 31 of the piston 24 and a transverse duct 32 of the piston 24, the output pressure space 28 of the proportional control valve 23 communicates with an annulus 33 that, inside the valve housing, is limited by a ring groove of the valve piston 24. In the case of a shifting of the valve piston 24, to the left according to FIG. 1, caused by operating the pedal, the connection of the output pressure space 28 with the tank 29 of the auxiliary pressure source is at first blocked. In the case of a further shifting, the annulus 33 is connected with the output 34 of the auxiliary pressure source 12. As a result, the high output pressure of the auxiliary pressure source 12 is also admitted to the front side of the valve piston 24 delimiting the output pressure space 28 on one side, and the valve piston is pushed back again against the shifting that took place through the operation by means of the brake pedal 22. In the resulting state of equilibrium, the output pressure located at the output 36 of the proportional control valve 23 is proportional to the pedal-operating force.

The auxiliary pressure source 12 consists of a pressure accumulator 37 that can be charged to the mentioned output pressure of 160 to 200 bar by an accumulator charge pump 39 via a return valve 41. A pressure switch 38 monitors the pressure in the accumulator and controls the accumulator charge pump to automaticlaly hold the pressure accumulator at the high output pressure level.

The pressure modulator 14 comprises a differential piston 48 that can be moved in a housing 41 having bores 43, 44, 46 and 47 of different diameters that are arranged successively along the central axis of said housing. The differential piston movably delimits, within the modulator housing 41 in the arrangement shown in FIG. 1, a first driving pressure space 49; a second ring-shaped driving pressure space 51, an also ringshaped counter pressure space 52 and an output pressure space 53 having an output 16 connected to the wheel brake 17.

The first driving pressure space 49, in axial direction, is delimited by the end front wall of the modulator housing that is on the right according to FIG. 1 and is movably delimited by a tappet-shaped driving stage 56. This first driving pressure space 49, is connected to the output 13 of the secondary output pressure space of the tandem master cylinder 11. This first driving pressure space 49 is separated from the second ring-shaped driving pressure space 51 by a partition 57 of the modulator housing 41. The tappet-shaped driving stage 56 of the modulator piston 48 is guided in the central bore 46 of partition 57 so that it can be shifted in a pressure-sealed way.

The second driving pressure space 51 is delimited by this partition 57 and is movably delimited by a flange-shaped piston stage 58 of the modulator piston 48. This flange-shaped piston stage 58 has a larger diameter than that of the tappet-shaped driving piston stage 56 and is sealed off with respect to the central bore stage 44 of the modulator housing 41 that has the largest diameter. The flange-shaped piston stage 58 separates the second driving pressure space 51 from the counterpressure space 52. The output pressure space 53 is delimited by the end front wall 61 of the modulator housing 41 and is movably delimited by a third piston stage 59 which is sealed with respect to the outer bore stage 43 of the modulator housing 41. The modulator piston 48 is forced into its shown normal position by restoring springs 62 and 63 that support themselves, on the one side, at the modulator housing and, on the other side, at the output stage 59 or the flange-shaped piston stage 58 respectively. Via a conventional anticavitation arrangement that may, for example, be formed by a return valve arrangement 64, if required, brake fluid can follow from the brake-fluid storage tank 66 of the brake unit 10 into the output pressure space 53 of the pressure modulator.

A control valve arrangement 18 is connected with the pressure modulator 14 and includes a boosting control valve 67 and a pressure reduction control valve 68 that can be triggered by control output signals of the electronic control unit 19 of the antilock system.

The boosting control valve 67, in the case of the shown special embodiment, is a 3/3-way electromagnetic valve. For a normal braking, i.e., a braking that is not subjected to antilock control, boosting control valve 67 is in its shown normal position 0 in which the pressure output 36 is the proportional control valve 23, via a passage flow path 69 of the boosting control valve 67, is connected to the ring-shaped second driving pressure space 51. In the case of a normal braking, the modulator piston 58 is therefore acted upon by the secondary output pressure of the tandem master cylinder 11 on the cross-sectional surface of its tappet-shaped driving stage 56 and by the output pressure of the proportional control valve 23 on the ring-shaped surface of its flange-shaped piston stage 58, causing the brake-force boosting.

The pressure reduction control valve 68, in the case of the shown special embodiment, is a 3/2-way electromagnetic valve. For a normal braking, it also takes up its normal position 0 in which the counterpressure space 52 of the pressure modulator 14 is relieved of pressure via a passage flow path 71 of the pressure-reduction valve 68 to the brake-fluid storage tank 66. In the case of a normal braking, the output pressure of the pressure modulator 14 is therefore proportional to the sum of the driving forces acting via the two driving stages 49 and 51 of the modulator piston 48.

The electronic control unit 19, processes wheelspeed-proportional output signals of wheel-speed sensors 19' and generates a first control output signal which directs the boosting control valve 67 into its blocking position I. This blocks the second driving pressure space 51 of the pressure modulator 14 with respect to the output 36 of the proportional control valve 23. As a result, the brake-force boosting is limited to the instantaneous value set before the transition of the boosting control valve 67 into its blocking position.

If, in the course of an antilock control phase, a pressure reduction is required in the wheel brake 17 connected to the pressure modulator 14, the electronic control unit 19 generates a second control output signal which directs the boosting control valve 67 into its alternative flow-through position II, and at the same time, directs the pressure-reduction control valve 68 into its energized position I. In the alternative flow-through position II of the boosting control valve 67, the second driving pressure space 51 of the pressure modulator 14 is relieved of pressure to the brake-fluid storage tank 66 so that the brake-force boosting is cancelled. Also, in the energized position I of the pressure-reduction control valve 68, the counterpressure space 52 of the pressure modulator 14, is connected to the high-pressure output 24 of the auxiliary pressure source 12 via the alternative flow-through flow path 72 of the pressure reduction control valve 68.

The high output pressure of the auxiliary pressure source 12 acts on ring of surface 73 of the flange-shaped piston stage 58 of the modulator piston 48. The ring surface 73 is sufficiently large to shift the modulator piston to the right according to FIG. 1 against the hydraulic actuating force that is still active via the smaller surface driving stage 56. This results in a volume enlargement of the output pressure space 53 of the pressure modulator 14 and thus a brake-pressure reduction in the wheel brake 17 required within the scope of the antilock control.

During a pressure-reduction phase of the antilock control, the modulator piston 48 must thus only be shifted against the actuating force generated by the admission of pressure to the first driving pressure space 49. Thus, the storage charge pump 39 must be designed only for a comparatively low nominal capacity in order to be able to keep the pressure accumulator 37 at the required output pressure level.

When a brake circuit includes two wheel brakes 17 and 74, as shown by interrupted lines in FIG. 1, connected to master brake line 76, individually triggerable pressure-keeping control valves 77 are provided in the line branches 76' and 76" starting from the master brake line 76 of this brake circuit and leading to the wheel brakes 17 and 74. One of the pressure-keeping control valves 77 can be directed from a normal passage position 0 into a blocking position I, so that, the brake pressure is reduced in only one of the wheel brakes 17 or 74, and the previously set brake pressure in the other wheel brake 74 or 17, is maintained. These pressure-keeping control valves 77 can also be triggered by control output signals of the electronic control unit in a sequence that is appropriate for the control.

Figure 2:
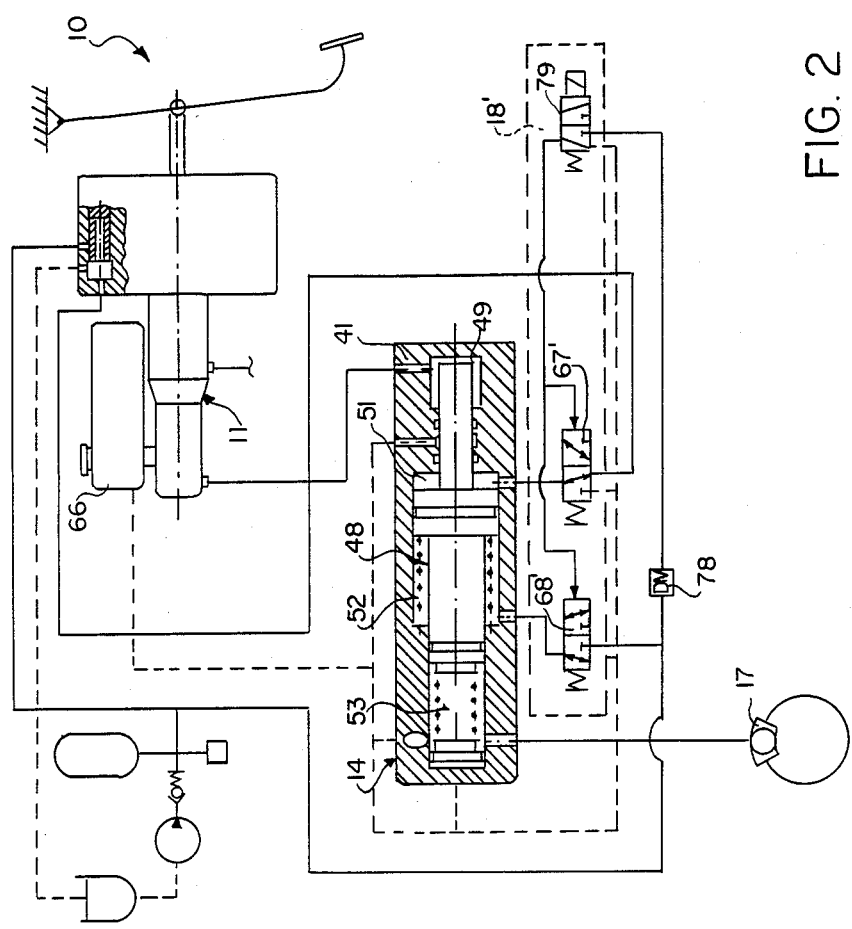
FIG. 2 is a second embodiment with jointly triggerable, hydraulically pilot-controlled boosting and brakepressure reduction control valves.

The embodiment of a pressure modulator arrangement according to the invention for a multiple-circuit brake system shown in FIG. 2, differs from that of FIG. 1 only by the special design of the control valve arrangement. Concerning the constructional and functional elements of the brake system 10 or of the pressure modulator 14 that have the same reference numbers in FIGS. 2 and 1, reference is made to the description of FIG. 1.

The control valve arrangement 18', according to FIG. 2, differs from that according to FIG. 1 functionally so that the removal of pressure from the second, ring-shaped driving pressure space 51 and the admission of pressure to the counterpressure space 52 for pressure reduction movement of the modulator piston 48 take place simultaneously. As a result, no pressure-keeping or block position is necessary for the boosting control valve 67' and it has the same 3/2-way valve design as the pressure-reduction control valve 68'. The boosting control valve 67' and the pressure-reduction control valve 68' are pressure-pilot-controlled valves, receiving the control pressure from the output pressure of the auxiliary pressure source 12 via a pressure reducer 78.

A 3/2-way electro-magnetic valve is provided as the pilot control valve 79 that is triggered by a control output signal of the electronic control unit 19 for a brake-pressure reduction. In the normal position 0 of pilot control valve 79, the control pressure spaces of the boosting control valve 67' and of the pressure-reduction control valve 68' are relieved of pressure to the brake-fluid storage tank 66. In the energized position I of the pilot control valve 79, the control output pressure of the pressure reducer 78 is coupled into the control pressures spaces of the boosting oontrol valve 67' and of the pressure-reduction control valve 68'.

Apart from the fact that the removal of pressure from the second driving pressure space 51 and the admission of pressure to the counterpressure space 52 always take place simultaneously in the embodiment according to FIG. 2, the operation of the pressure modulator arrangement 14, 18 according to FIG. 2 is completely analogous to that of FIG. 1.

Figure 3:
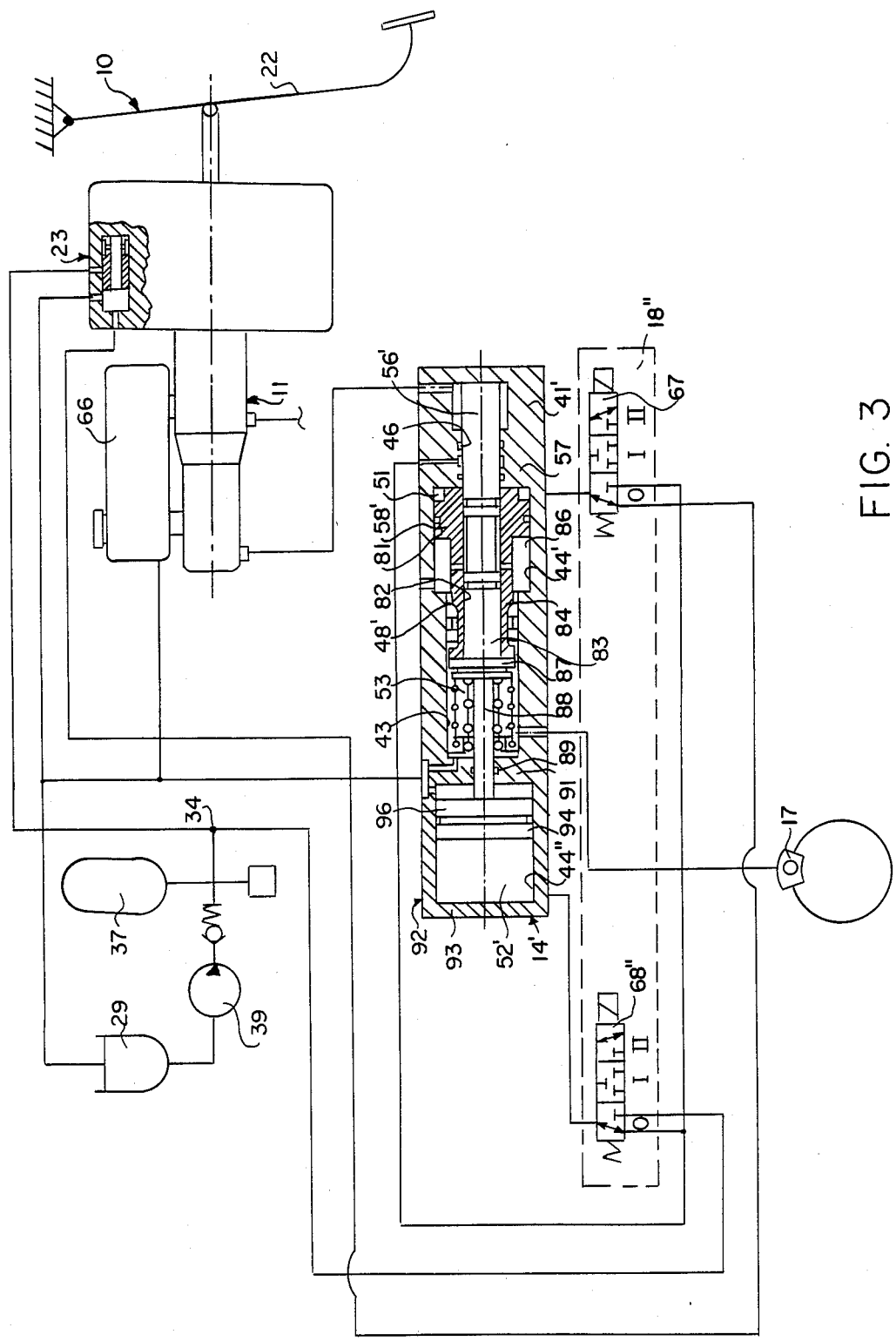
FIG. 3 is another embodiment of a pressure modulator arrangement according to the invention, in which the modulator pistons are developed in two parts.

In the case of another embodiment of a pressure modulator arrangement 14', 18'', according to the invention that is shown in FIG. 3, the elements that are analogous in regard to construction and operation with the elements of the arrangements according to FIGS. 1 and 2 have the same references numbers as in FIGS. 1 and 2. Thus reference can be made to the respective parts of the description, and the following description can be directed to the characteristic differences of the embodiment according to FIG. 3.

In the case of the pressure modulator 14' according to FIG. 3, the modulator piston 48' is in two parts. It comprises an outer ring piston 81 having a central bore 82 in which a plunger piston 83 slides in a pressure sealed manner. The plunger piston 83 penetrates the ring piston 81 over its whole length and has a section 56' that operationally corresponds to the tappet-shaped driving stage 56 of FIG. 1. The section 56' is acted upon by the output pressure of the tandem master cylinder 11 coupled into the first driving pressure space 49. The plunger piston 83 is sealed off with respect to the bore 46 of the partition 57 of the modulator housing 41'.

The ring piston 81 has a flange 84 that is sealed off with respect to the bore stage 43 and delimits the output pressures space 53 of the pressure modulator 14' in radial direction, and a flange 58' of a larger diameter that is sealed off with respect to the medium bore stage 44' of the modulator housing 41'. By means of this larger piston flange 58' and partition 57, the second driving pressure space 51 is delimited and can be acted upon by the output pressure of the proportional control valve 23. An annulus 86, extends between the two piston flanges 58' and 84 of the ring piston, and is delimited by the bore stage 44' in radial direction. Annulus 82 is an anticavitation space connected to the brake-fluid storage tank 66 of the brake system or the tank 29 of the auxiliary pressure source 12.

The plunger piston 83 has a pulling flange 87 on the side of the output pressure space 43. The ring piston 81 supports itself at said pulling flange 87 when the ring-shaped second driving pressures space 51 is acted upon by the output pressure of the proportional control valve 23. The force that acts on the modulator piston 48', for normal braking to buildup the pressure in the output pressure space 53, is proportional to the sum of the forces that result from the admission of the output pressure of the tandem master cylinder 11 to the first driving pressure space 49 and from the admission of the output pressure of the proportional control valve 23 to the second driving pressure chamber 51.

The plunger piston 83 is provided with a tappet-shaped extension 88 penetrating the output pressure space 53 in axial direction and passing through and being sealed off with respect to a central bore 89 of a transverse wall 91 of the modulator housing 41'. A bore stage 44'', in a lengthening 92 of the modulator housing 41' that is opposite in the output pressure space 53, is closed off by the end front wall and transverse wall 91. An auxiliary piston 94 slides in a pressure sealed way in bore stage 44'' and delimits the counterpressure space 52' in combination with the front end wall 93. The output pressure of the auxiliary pressure source 12 is coupled into said counterpressure space 52' via the pressure-reduction control valve 68' when the antilock control responds. A balancing space 96, that is delimited by the auxiliary piston 94 and the transverse wall 91 of the modulator housing 41, is constantly connected with the brake-fluid storage tank 66 and the tank 29 of the auxiliary pressure source 12.

The boosting control valve 67 within the control valve arrangement 18'' is completely analogous to that of FIG. 1. In FIG. 3, the pressure-reduction valve 68'' is also a 3/3-way electro-magnetic valve that, in addition to the alternative flow-through positions 0 and II, can be directed into a pressure keeping position I. By directing the pressure reduction control valve 68'' into its blocked position I, the modulator piston 48' can be "locked" hydraulically. Thus, the pressure in the output pressure space 53 of the pressure modulator 14' cannot be increased when the boosting control valve 67 is in its normal position 0. In the energized position II of the pressure reduction control valve 68', the high output pressure of the auxiliary pressure source 12 is coupled into the counterpressure space 52'. This pushes the auxiliary piston 94, and the primary piston 48' as a whole via the tappet-shaped extension 88 of the plunger piston 83 to the right, according to FIG. 3. This causes the volume expansion of the output pressure space 53 resulting in the reduction of pressure in the wheel brake 17.

The pressure modulator 14' is designed to assure a pressure intensification when the auxiliary pressure source fails and thus when the brake-force boosting breaks down. The first driving pressure space 49 for the plunger piston 83 is selected to be a smaller cross-sectional surface than the bore stage 43 that radially delimits the output pressure space 53 of the pressure modulator 14'. Thus while the pedal-actuating path and the shifting path of the plunger piston 83 are extended, nevertheless a pressure can be built up in the output pressure space 53 of the pressure modulator 14' that ensures a braking of the vehicle with the legally required minimum deceleration.

Figure 4:
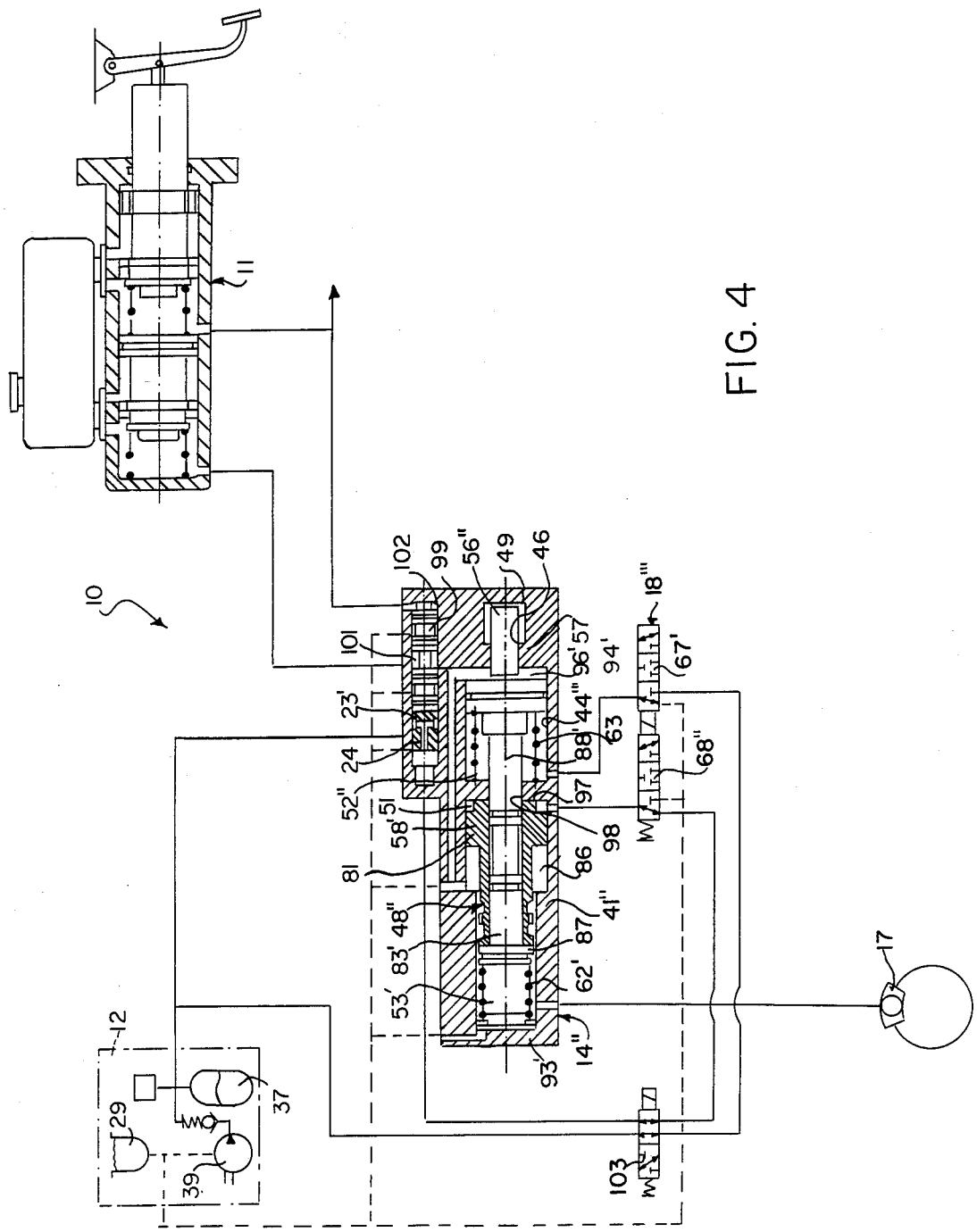
FIG. 4 is another embodiment of a pressure modulator arrangement according to the invention that can be used for antilock control as well as for propulsion control of a motor vehicle.

FIG. 4, illustrates some variatns of the pressure modulator arrangement according to the invention that can be realized in combination with the above-explained embodiments or alternatively to the operationally corresponding components of it. In FIG. 4 also, elements that are identical or analogous in regard to construction and operation to the elements of FIGS. 1 to 3 in each case have the corresponding reference numbers so that to that extent, reference can be made to the above-mentioned parts of the description.

The pressure modulator 14'' according to FIG. 4, is operationally equivalent to the pressure modulator 14' according to FIG. 3 and differs from that modulator constructively. The bore stage 4''' and the auxiliary piston 94', by which the brake-pressure reduction is achieved in the wheel brake 17 connected to the output pressure space 53' of the pressure modulator 14'', are placed inside the modulator housing 41'' and extends between an inside transverse wall 97 of the modulator housing 41'' and the partition 57. A driving piston element 56'', that operationally corresponds to the driving stage 56' of FIG. 3, slides in a pressure sealed manner in central bore 46 of portion 57 and forms the movable axial delimitation of the first driving pressure space 49 of the pressure modulator 14''.

The modulator piston 48'' is in two parts having an outer ring piston 81 and a plunger piston 83' that can be slid in it. Together they form the movable delimitation of the output pressure chamber 53' and the end front wall 93' of the modulator housing 41'' forms the fixed axial delimitation. The plunger piston 83' has an axial lengthening 88' that is sealed off with respect to a central bore 98 of the partition 97 and is firmly connected with the auxiliary piston 94'. This partition 97, delimits on the one side second driving pressure space 51 of the pressure modulator 14", that is movably delimited by the ring piston 81 and delimits on the other side the counterpressure space 52", that is movably delimited by the auxiliary piston 94'.

The high output pressure of the auxiliary pressure source 12 is coupled into said counterpressure space 52' via the control valve arrangement 18'''. The anticavitation space 96', that is movably delimited on the other side by the auxiliary piston 94', and the follower space 86, that is delimited by the flanges 58' and 87' of the ring piston, are connected with the tank 29 of the auxiliary pressure source 12. The modulator piston 48" is pushed into its shown normal position by restoring springs 62' and 63' that support themselves at the plunger piston 83' and at the auxiliary piston 94' respectively. For constructive reasons, the driving piston element 56" is developed as a piston part that is separate from the plunger piston 83'. In the control valve arrangement 18"', valve elements 67' and 68''', that correspond to the control valves 67 and 68", are combined as a reversing valve that can be controlled by only one control electro-magnet.

As a further difference to the above-explained embodiments, a proportional control valve 23' is provided that in this case is not in the tandem master cylinder 11' but is in a modulator unit that is physical is separate from the tandem master cylinder 11'. As a maximum, proportional control valve 23' comprises a number of pressure modulators 14, 14' or 14" corresponding to the number of wheel brakes, in which case only one proportional control vavle 23' per vehicle is required. The valve piston 24 of the proportional control valve 23', in this case, is driven hydraulically by means of the primary and secondary output pressures of the tandem master cylinder 11 that can be operated by a pedal. The primary and secondary output pressures are coupled into valve driving pressure spaces 101 and 102 that are set off with respect to one another by means of a separating piston 99. One of these driving pressure spaces, in the case of the shown embodiment the driving pressure space 101 that is connected to the secondary output pressure space of the tandem master cylinder 11, is connected with the first driving pressure spaces 49 of the provided pressure modulators.

Finally, a reversing electro-magnetic valve 103 is provided that can be triggered by output signals of the electronic control unit of a propulsion control arrangement that is not shown and with which the antilock system may be combined. The reversing electro-magnetic valve 103 has a normal position 0, that is suitable for the normal braking operation and the antilock control operation, and an energized position I in which the second driving pressure space 51 of the pressure modulator 14" is connected to the high-pressure output of the auxiliary pressure source 12. Thus the wheel brake 17 connected to the pressure modulator 14" can be actuated independent of an actuating of the brake pedal.

Irrespective of the number of vehicle wheels brake circuits that are to be subjected to a propulsion control, only one reversing valve 103 per vehicle is required. the fluid inputs of the control valve arrangements 18''' can be connected inparallel to theo utputs of the reversing valve 103 and the control vavles 18''' can be triggered by output signals of the propulsion control arrangement in such a way that the control in each case can become effective only at those vehicle wheels that tend to slip.

Although the present invention has been described and illustrated indetail, it is to be clearly understood that the same is by way of illustration and example only, and is not to be taken by way of limitation. The spirit and scope of the present invention are to be limited only by the terms of the appended claims.

What is claimed:

1. A pressure modulator system for use with a statically operated, power-assisted, hydraulic brake sytem of a vehicle including brake pressure control device for providing a pedal pressure, a proportional control device for providing a proportional pressure which is proportional to and substantially greater than said pedal pressure, an auxiliary pressure source, a statically operated brake circuit and antilock control unit, said pressure modulator system comprising:
   a modulator housing;
   a modulator piston means in said modulator housing for defining a modulator output pressure space, which can be coupled to said brake circuit, from a first driving pressure space, into which said pedal pressure can be coupled to decrease said output pressure space, from a second driving pressure, space, into which said proportional pressure can be coupled to boost decreasing of said output pressure space, and from a counterpressure space into which an auxiliary pressure can be coupled to increase said output pressure space; and
   control valve means connectable to said brake pressure control device, said proportional control device, said auxiliary pressure source and said modulator housing for connecting said proportional pressure to said second driving space and relieving pressure in said counterpressure space in a normal braking position and for connecting said auxiliary pressure to said counterpressure space and relieving pressure from said second driving space in an antilocking position.

2. A pressure modulator system according to claim 1 wherein:
   said modulator housing has a narrow bore stage and a wide bore state and
   said modulator pisotn means has a tappet-shaped extension defining said first driving pressure space in said narrow bore stage and a ring flange on said tappet-shaped extension defining said second driving pressure space as an annulus in said wide bore stage.

3. A pressure modulator system according to claim 2 wherein
   said housing having a third bore stage; and
   said modulator piston means having a second tappet-shaped extension and an auxiliary piston connected to said second tappet-shaped extension for defining said counterpressure space in said third bore stage.

4. A pressure modulator system according to claim 3 wherein said housing includes a wall separating said third bore stage from said outputpressure space, said second tappet-shaped extension transverses a bore in said wall, and the space between said wall and auxiliary piston is relieved of pressure.

5. A pressure modulator system according to claim 1 wherein said modulator piston means has an auxiliary piston connected thereto for defining said counterpressure space into a third bore stage.

6. A pressure modulator system according to claim 5 wherein said hosuing includes a first wall that separates said wide bore stage from said third bore stage and a second wall that separates said narrow bore stage from said third bore stage, said counterpressure space being between said auxiliary piston and said first wall, and said space between said auxiliary piston and said second wall is relieved of pressure.

7. A pressure modulator system according to claim 1 wherein the modulator piston means includes an outer ring piston and a plunger piston that slides in a central bore of the ring piston, the effective cross-sectional surface of said plunger piston, that defines said first driving pressure space, being smaller than the cross-sectional surface of the output pressure space that is defined by the whole modulator piston.

8. A pressure modulator system according to claim 7 wherein said piston plunger includes a radial pulling flange engaging said ring piston at the front face defining said output pressure space; and wherein said modulator piston means includes an auxiliary piston defining said counterpressure space.

9. A pressure modulator system according to claim 1, wherein the control valve means includes:
 a first valve means, in its normal braking position, establishing the connection of the second driving pressure space with the output of the proportional pressure, and in its antilocking position, relieving pressure in the second driving pressure space; and
 a second valve means, in its normal braking position, relieving the pressure in the counterpressure space, and in its antilocking position, connecting the counterpressure space with the auxiliary pressure source.

10. A pressure modulator system according to claim 9, including brake controlmeans for simultaneously directing said first valve means into its antilocking position relieving pressure from the second driving pressure space and directing said second valve means into its antilocking position connecting the counterpressure space to the auxiliary pressure source.

11. A pressure modulator system according to claim 10, wherein said first and second valves are pressure-controlled valves, the control pressure of which is connected via a reversing electro magnetic valve.

12. A pressure modulator system according to claim 1 wherein the proportional control device is a pressure-controlled sliding valve having a control pressure space, the pedal pressure of the brake pressure control device is utilized as the control pressure into said control pressure space.

13. A pressure modulator system according to claim 12, including a separating piston connected to said sliding valve in the control pressure space of the proportional control device, for defining with said slider valve a first control pressure space on the one side, and defining a second control pressure space, the output pressure of one output circuit of the brake pressure control device being coupled into the first control pressure space, and the output pressure of the other pressure space of the brake pressure control device being coupled into the second control pressure space.

14. A pressure modulator system according to claim 13, wherein the output pressure of the primary circuit of the braking device is coupled into the first control pressure space that is defined by the separating piston and the valve piston of the proportional control valve, and the output pressure of the secondary circuit of the braking device is coupled into the second control space of the proportional control valve, and wherein the bore section in which the separating piston slides has a larger cross-section than the bore section in which the valve piston is slidably arranged.

15. A pressure modulator system according to claim 1 wherein for the vehicle also being equipped with propulsion control that decelerates a vehicle wheel that tends to slip by actuating its wheel brake to such an extent that its spin remains within a value range that is compatible with good driving stability, a control valve is provided which is directed by an output signal of an electronic control unit of the propulsion control from a normal position, in which said proportional pressure is coupled via the control valve means into the second driving pressure space of the modulator, into an energized position, in which said auxiliary pressure source is coupled into said second driving pressure space.

* * * * *